(12) United States Patent
Moore

(10) Patent No.: US 10,802,527 B1
(45) Date of Patent: Oct. 13, 2020

(54) MECHANICAL BUTTON INTERFACE FOR USE WITH ENVIRONMENTAL CONTROLS

(71) Applicant: Braeburn Systems LLC, Montgomery, IL (US)

(72) Inventor: Glenn Moore, Geneva, IL (US)

(73) Assignee: BRAEBURN SYSTEMS LLC, Montgomery, IL (US)

(*) Notice: Subject to any disclaimer, the term of this patent is extended or adjusted under 35 U.S.C. 154(b) by 0 days.

(21) Appl. No.: 16/592,396

(22) Filed: Oct. 3, 2019

(51) Int. Cl.
| | |
|---|---|
| *G05G 1/02* | (2006.01) |
| *G06F 3/02* | (2006.01) |
| *G06F 3/0482* | (2013.01) |
| *G06F 3/0484* | (2013.01) |

(52) U.S. Cl.
CPC ............ *G05G 1/02* (2013.01); *G06F 3/0202* (2013.01); *G06F 3/0482* (2013.01); *G06F 3/04847* (2013.01)

(58) Field of Classification Search
USPC .......................................... 345/156, 170–178
See application file for complete search history.

(56) References Cited

U.S. PATENT DOCUMENTS

| | | | | |
|---|---|---|---|---|
| 7,693,583 B2* | 4/2010 | Wolff | ................. | G05B 19/0423 700/17 |
| 10,317,867 B2* | 6/2019 | Moore | ............... | G05B 19/0426 |
| 10,317,919 B2* | 6/2019 | Poplawski | ............... | F24F 11/30 |
| 2001/0003451 A1* | 6/2001 | Armstrong | .............. | A63F 13/06 345/173 |
| 2003/0121652 A1* | 7/2003 | Carey | ................ | G05D 23/1904 165/238 |
| 2004/0245352 A1* | 12/2004 | Smith | ................ | G05D 23/1904 236/94 |
| 2004/0262410 A1* | 12/2004 | Hull | .................... | G05D 23/1904 236/91 R |
| 2007/0228183 A1* | 10/2007 | Kennedy | ............ | G05D 23/1905 236/1 C |
| 2008/0133033 A1* | 6/2008 | Wolff | ................. | G05B 19/0423 700/83 |
| 2011/0004825 A1* | 1/2011 | Wallaert | ............. | B60H 1/00985 715/702 |
| 2014/0163746 A1* | 6/2014 | Drew | ...................... | F24F 11/30 700/276 |

* cited by examiner

*Primary Examiner* — Tony O Davis
(74) *Attorney, Agent, or Firm* — The Law Offices of Konrad Sherinian LLC

(57) ABSTRACT

An environmental controller for use within a comfort control system is disclosed. The environmental controller includes a microprocessor controlled display that incorporates a pair of mechanical buttons, generally known as an "UP" button and a "DOWN" button. The display is adapted to dispose a variety of system/installer modes, including a residential mode. The system modes make use of BACK, NEXT, and RETURN buttons, which are used to navigate through the various system/installer modes along with the increment/decrement mechanical buttons.

15 Claims, 7 Drawing Sheets

MECHANICAL BUTTON INTERFACE FOR USE WITH ENVIRONMENTAL CONTROLS

CROSS REFERENCE TO RELATED APPLICATIONS

NONE.

FIELD OF THE DISCLOSURE

The present invention generally relates to indoor comfort control systems, and more particularly relates to a comfort control system that provides a mechanically controlled graphical interface as defined herein. More particularly still, the present disclosure relates to a comfort control system that utilizes a display with a mechanical button interface.

DESCRIPTION OF BACKGROUND

Comfort control systems, such as heating systems, ventilation systems, air conditioners, humidifiers and dehumidifiers, carbon control, drip and other irrigation controllers, grow lamps and other sunlight controls are widely used in residential and commercial buildings. These environment regulation systems (also referred to herein as comfort regulation systems and comfort systems) are usually controlled by environmental control systems, such as thermostats, humidistats, or other climate control devices. An environmental control system is electronically wired to one or more comfort systems. A user configures the comfort control system. The configuration is then applied by the comfort control system in controlling the operation of the comfort system. The configuration can include, for example, desired temperatures and humidity levels for certain time frames.

Environmental control systems can have multiple functions that require user input, such as setting up time-of-day or day-of-week programs, programming temperature set points or programming user settings. Control panels typically include an assortment of buttons or switches for operating the control and adjusting the settings. For example, the classic thermostat includes a round dial that displays the present temperature sensed at the thermostat and allows a desired temperature to be set, along with a pair of three-position switches, with the first switching the environmental control system between heating, off and cooling, and the second switching the fan between on, off and auto settings. Adjusting settings using the assortment of buttons and switches can often times be confusing to the user and require detailed review of user manuals and instruction guides in order to properly operate the environmental control system and adjust the settings of the environmental control system to those desired by the user.

In some cases a display may be provided that includes a touch sensitive area. The touch sensitive area can include numerals, word phrases, or icons (collectively, "graphics") that appear on the display screen. By touching the appropriate graphic, the user can make adjustments to the functioning of the environmental control system and activate specific modes of operation or make setting adjustments. Some display screens include so many graphics that is difficult for the user to find the appropriate graphic. Also when multiple graphics are displayed on a screen so that the maximum number of functions may be identified via the graphics on the single screen, the size of each individual graphic may tend be small. Due to the small size of the graphical buttons displayed on the screen and the overpopulation of the display screen with multiple graphical buttons, it can be very difficult for a user to operate such an environmental control system.

Most prior art environmental control system are known to have a collection of hard buttons along with a display. For example, many prior art environmental control system utilize a collection of buttons for certain "hard functions." For example, many prior art environmental control system will have a button that calls up the set time/set date function, a button that toggles the fan function between on, off and auto, and a button that changes between cool, heat, and off. However, such an arrangement is unintuitive. In particular, while in the past, such direct, hard button interfaces were common, users today are far more accustomed to a "browser interface."

Other prior art environmental control systems have utilized touch screens to satisfy all, or nearly all, of the functions of the thermostat. Such solutions have their place, but are often slower to respond than hard function systems, and touch screens also lack tactile feedback that many users prefer.

OBJECTS OF THE DISCLOSED SYSTEM, METHOD, AND APPARATUS

Accordingly, it is an object of this disclosure to provide an environmental controller that utilizes mechanical buttons to adjust setpoints.

Another object of this disclosure is to provide an improved environmental controller that utilizes a display with a variety of system modes that use buttons to navigate between various screens within the modes.

Another object of this disclosure is to provide an improved environmental controller that utilizes a next button to move to next screens and modes.

Another object of this disclosure is to provide an improved environmental controller that utilizes a back button to move to previous screens and modes.

Another object of this disclosure is to provide an improved environmental controller that utilizes a return button to move between system modes and an operative mode.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

An environmental controller is disclosed. The environmental controller comprises a housing that includes an upper component with a display cutout. A display, such as an LCD display or LED display is disposed with the display cutout. A circuit board is disposed within the housing, and is coupled to the display by, for example, a cable that is connected to the circuit board by soldering or by a connector. A processor is mounted on the circuit board and is coupled to the display, generally by wire traces. A plurality of mechanical switches are mounted on the front of the upper housing near the display, including a pair of switches being disposed to one side of the display with one switch being mounted above the other switch so that the top switch can represent "UP," and the lower switch can represent "DOWN." At least three additional mechanical switches are mounted on the front of the upper housing, with one mechanical switch being assigned a "NEXT" function, a second mechanical switch being assigned a "BACK" function, and a third mechanical switch being assigned a "RETURN" function. The mechanical switches are coupled to the circuit board by receptors, with the receptors generating signals when activated by the corresponding mechanical switch.

In addition to an operative mode including standard functions, the environmental control also includes a number of system modes. The system modes also include set points, which are adjusted using the mechanical switches, including the navigation buttons; i.e., the back button, the next button, and the return button. The next button is used to switch between screens and modes, the back button is used to switch to previous screens, and the return button is used to return to the operative mode.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
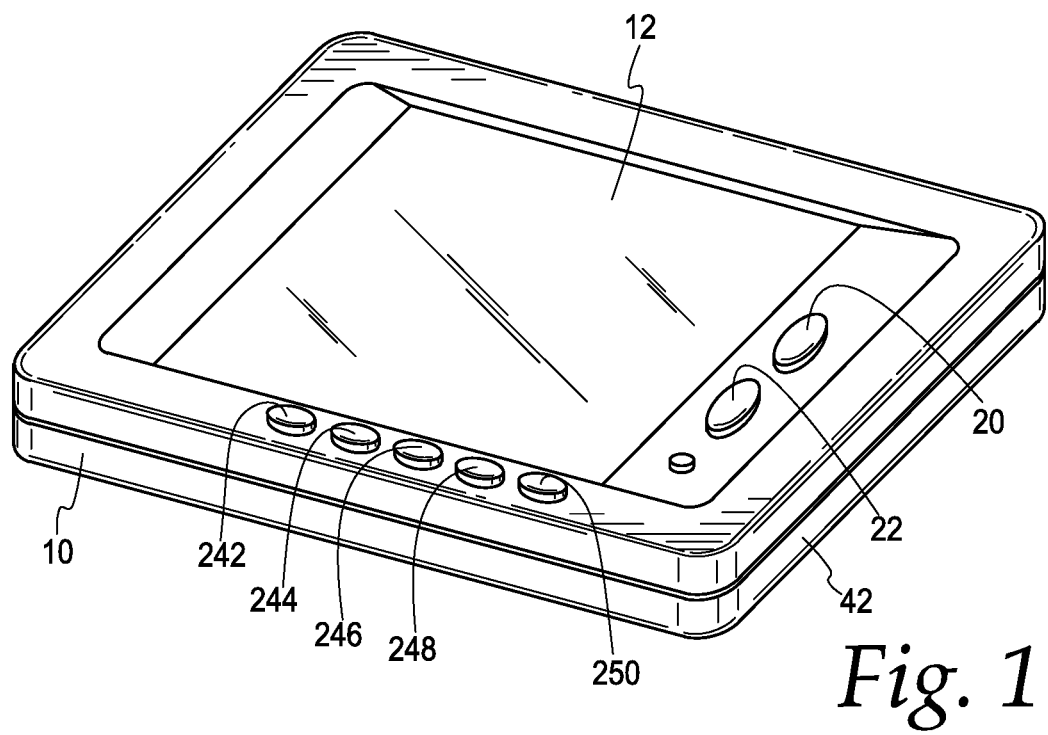
FIG. 1 illustrates a bottom front perspective view of an environmental control constructed in accordance with the present disclosure.

An embodiment of the present invention is depicted with respect to the following FIGS. 1-15 and in particular the physical construction of the invention is described with respect to FIGS. 1-5 as follows. An environmental controller 10 includes a display screen 12 and a printed circuit board 15 mounted within a housing. A pair of mechanical buttons 20 and 22, which can be divided into an up button 20 and down button 22, are mounted on the front of the environmental control 10. In addition, five separate mechanical buttons, 242, 244, 246, 248 and 250 are also mounted on the front of the environmental control 10. The environmental control 10 includes a front face 17. The aforementioned mechanical buttons are mounted so that the mechanical buttons are exposed in the front face 17 and may be easily operated by a user. As shown in FIG. 1, the environmental controller 10 is oriented so that one of the mechanical buttons 20 is located at the upper portion of the environmental controller 10 and the second mechanical button 22 is located toward the lower portion of the environmental controller 10. Accordingly, the one mechanical button 20 can act as an "up" button, and accordingly, can serve as the "up" incrementation of adjustment of a set point. In addition, the mechanical button 22 can serve as a "down" button, and accordingly, can act as a decrementation or adjustment of a set point. As will be discussed in more detail below, the mechanical buttons 20 and 22 also act in other capacities as well. Similarly, the five additional mechanical buttons are shown mounted below the display, although they could be mounted in other areas. Further, each of the mechanical buttons can be assigned one or more functions. For example, mechanical button 242 can be assigned the "FAN" function, mechanical button 244 can be assigned the "DATE/TIME" function, mechanical button 246 can be assigned the "BACK" function, mechanical button 248 can be assigned the "NEXT" function, and mechanical button 250 can be assigned the "RETURN" function. Certain mechanical buttons can assigned additional functions as well. For example, mechanical button 246 can be assigned an additional "PROGRAM" function, mechanical button 248 can be assigned an additional "HOLD" function, and mechanical button 250 can be assigned an additional "SYSTEM" function.

Figure 2:
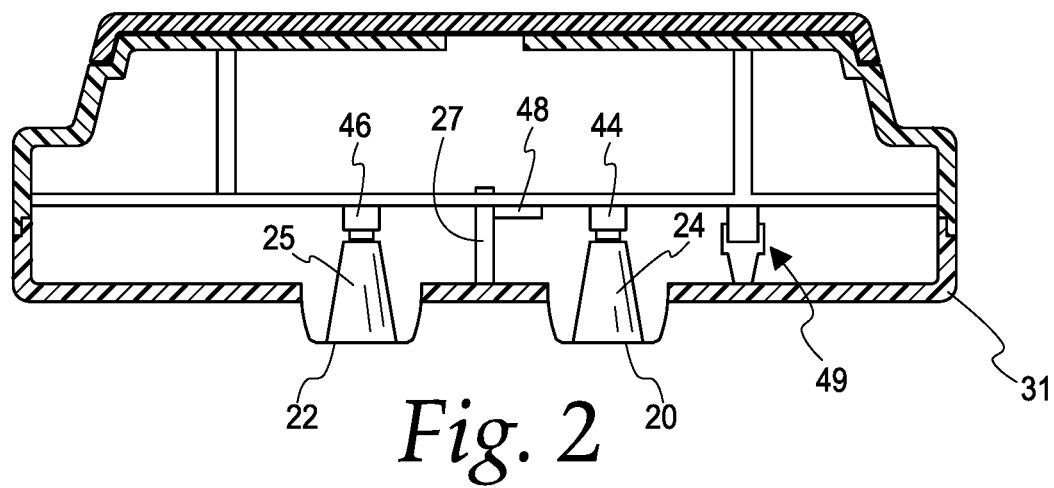
FIG. 2 is a side elevation view of the environmental control depicted in FIG. 1.
Figure 3:
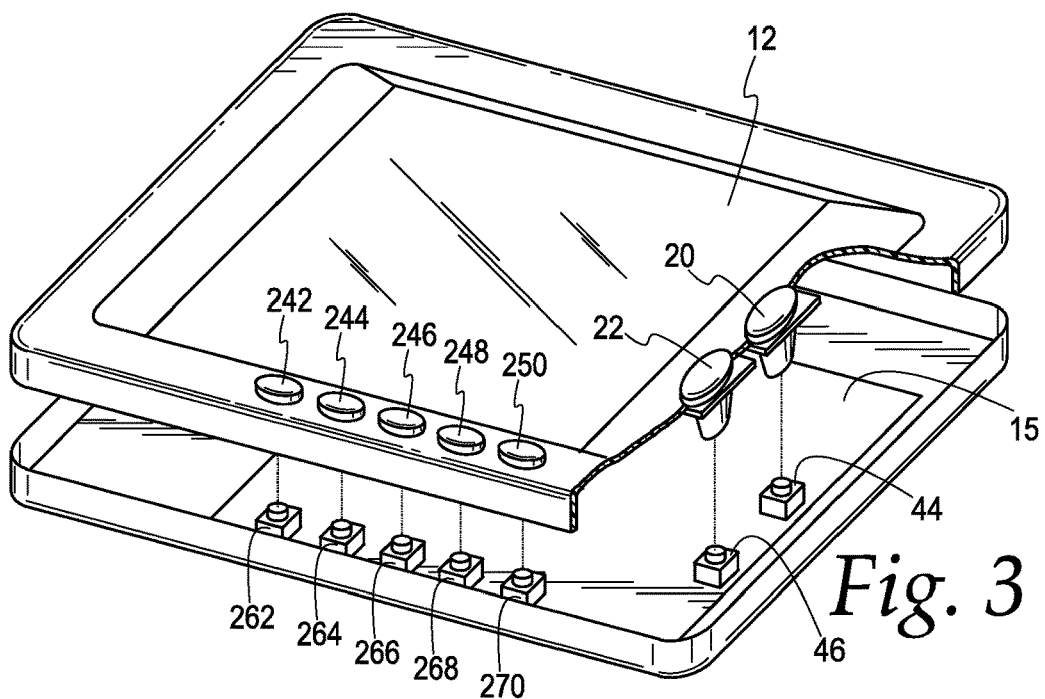
FIG. 3 is a perspective view of the environmental control depicted in FIG. 1 with the upper housing has been removed.

Turning to FIGS. 2 and 3, a more detailed description of the environmental control system 10 and its assembly will be discussed. The mechanical switch 20 may include an actuator 24. When the mechanical button 20 is pressed, the actuator 24 is driven towards the printed circuit board 15. Similarly, the mechanical switch 22 includes an actuator 25, and when the mechanical button 22 is pressed, the actuator is driven towards the printed circuit board 15. A support 27 is disposed between actuator 24 and actuator 25, and is used to provide structural support.

An upper housing 31 is provided which encloses the display screen 12 and provides a covering over the printed circuit board 15 and other components thereon. The upper housing 31 provides an aperture pocket 35 within which mechanical buttons 20 and 22 are mounted. The circuit board 15 is mounted in an upper housing 31 (FIG. 2). Mounted on the printed circuit board 15 are a first receptor 44 and a second receptor 46. Other components mounted to the printed circuit board 15 include a microprocessor 48, relays, connectors, switches and thermistor(s). The receptors 44, 46 may include components such as switches. As shown in FIGS. 2 and 3 it may be understood that pressing the mechanical buttons 20 and 22 causes the actuators 24 and 25 to move in a downward direction towards the receptors 44 and 46, which will then activate the receptors 44 and 46. As will be discussed further below, in some cases this actuation this will cause a set point of an operative mode of operation to increment or decrement as appropriate, or for a different action to be taken explained herein. For example, pressing mechanical button 242 can cause a fan mode of the controller to shift between, for example, ON, OFF and AUTO; pressing mechanical button 244 can bring up a SET DATE/TIME mode where the date and time of the environmental controller can be adjusted; pressing mechanical button 246 can execute the BACK function as explained in more detail herein; pressing mechanical button 248 can execute the NEXT function as explained in more detail herein; and pressing mechanical button 250 can execute the RETURN function as explained in more detail herein.

Figure 4:
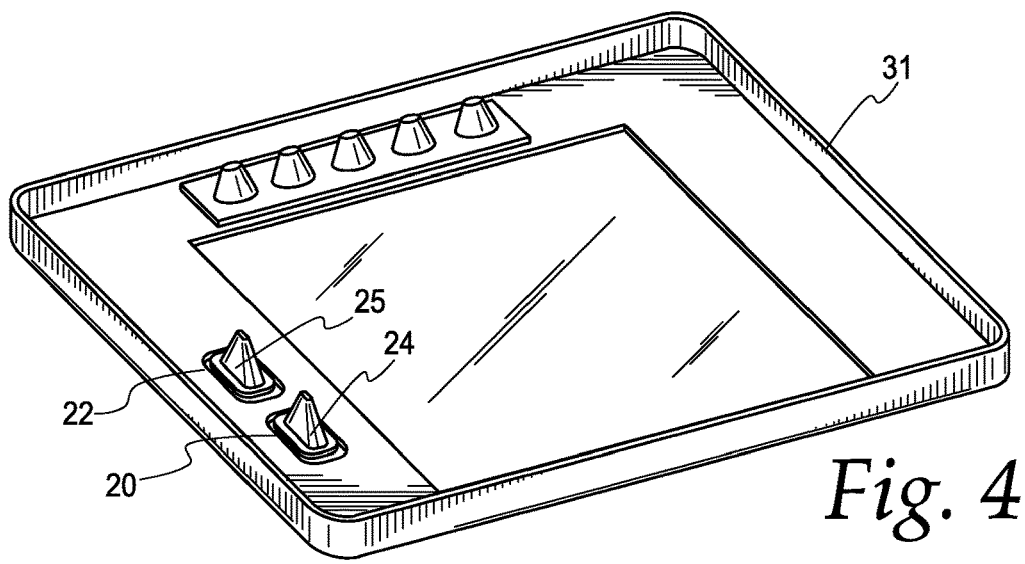
FIG. 4 is a bottom perspective view of the upper housing of the environmental control depicted in FIG. 1.
Figure 5:
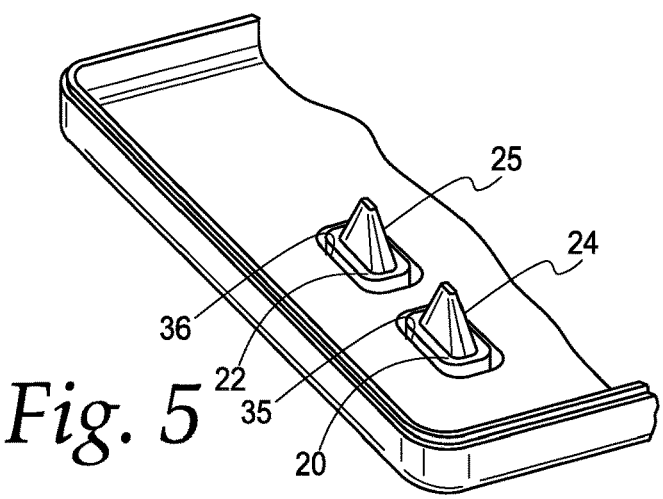
FIG. 5 is an enlarged view of the button portion of the upper housing depicted in FIG. 4.

The operation of the mechanical buttons can be understood in more detail in respect to FIGS. 4 and 5. It should be noted that the explanation relates to mechanical buttons 20 and 22, but applies to all of the mechanical buttons and receptors. In an embodiment, since the first and second actuators 24, 25 are already resting on the receptors 44, 46, respectively only a slight press of the mechanical buttons 20 and 22 is necessary in order to close the switch of the first or second receptors 44, 46 respectively. For example, in an embodiment, a movement of the first actuator 24 of 0.005 inches will actuate the first receptor 44.

In an embodiment, the first mechanical button switch 20 is mounted in a pocket 35, and the second mechanical button 22 is mounted in a pocket 36. The upper housing 31, including the mechanical buttons 20 and 22, are then mounted onto the lower housing 42. The upper housing 31 may be attached to the lower housing 42 in any manner such as the snap-fit of tabs or via fasteners, such as screws. Prior to assembly of the upper housing 31, the printed circuit board 15 and its components and the display screen 12 are mounted within the lower housing 42. In this manner, the actuators 24 and 25 can be held within the pockets 35 and 36 in close proximity to the first and second receptors 44 and 46. In an embodiment, the display screen 12 may be a liquid crystal display (LCD) having a segmented format. Alternate embodiments may include dot matrix LCD displays, LED display screens, OLED display screens (including passive and active matrix LED display screens), or other types of display screens.

Pressing one of the mechanical buttons 20 and 22 will cause the receptors 44, 46 to open and close in order to operate the environmental controller 10. The mechanical buttons 20 and 22 may be operated by, for example, single finger strokes where each depression will cause for example, a single increment to a set point value (e.g. increase or decrease in a temperature setting, etc.). As well, the mechanical buttons 20 and 22 may be programmed to allow for sequential increments or decrements when the button 20 or 22 is held down for more than a set time period, such as, for example, one second. For example, if a user's finger depresses mechanical button 20 for more than one second, in an embodiment, it will increment at a rate of two times per second while the first actuator 24 maintains its depression of the first receptor 44. Likewise, if a user's finger depresses the second mechanical button 22 for more than one second it will depress the receptor 46 continuously and will cause a decrement at the rate of two times per second (e.g. decrease a temperature setting in a sequential, automated manner).

Figure 6:
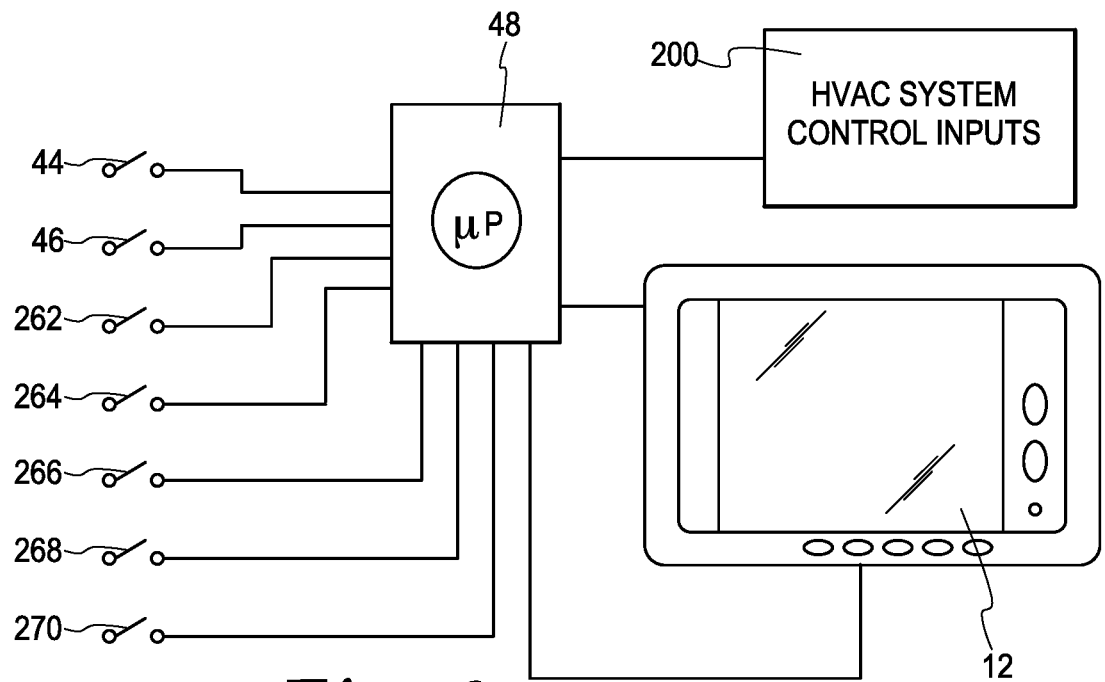
FIG. 6 is a simplified schematic diagram of circuitry for use with the disclosed environmental control

Turning to FIG. 6, an overview of the electronic circuitry and components of the environmental controller 10 of the present invention will be described. Switch 1 is provided, such as the first receptor 44, which may be opened and closed in order to signal the microprocessor 48. As well a Switch 2, such as the second receptor 46, is provided which may be opened or closed to signal the microprocessor 48. In addition, five additional switches 262, 264, 266, 268, and 270 corresponding to the five additional mechanical buttons 242, 244, 246, 248, and 250, feed additional signals to the microprocessor 48. The microprocessor controls the HVAC system 200 attached to the environmental control system 10 and also is connected to the display 12, which allows for user input to adjust the system. For example, in a typical HVAC system 200, the environmental control system 10 would be used to adjust the comfort control system in order to provide a comfortable environment for the occupants. The microprocessor 48 includes persistent memory, such as FLASH, which may have software loaded into it, in order to control the environmental control system 10 and to provide for the display screen functionality. As will be discussed in greater detail below by operation of the various switches the microprocessor 48 can monitor and control, the air handler HVAC system 200 or any other system to which the environmental control system 10 is connected.

Figure 7:
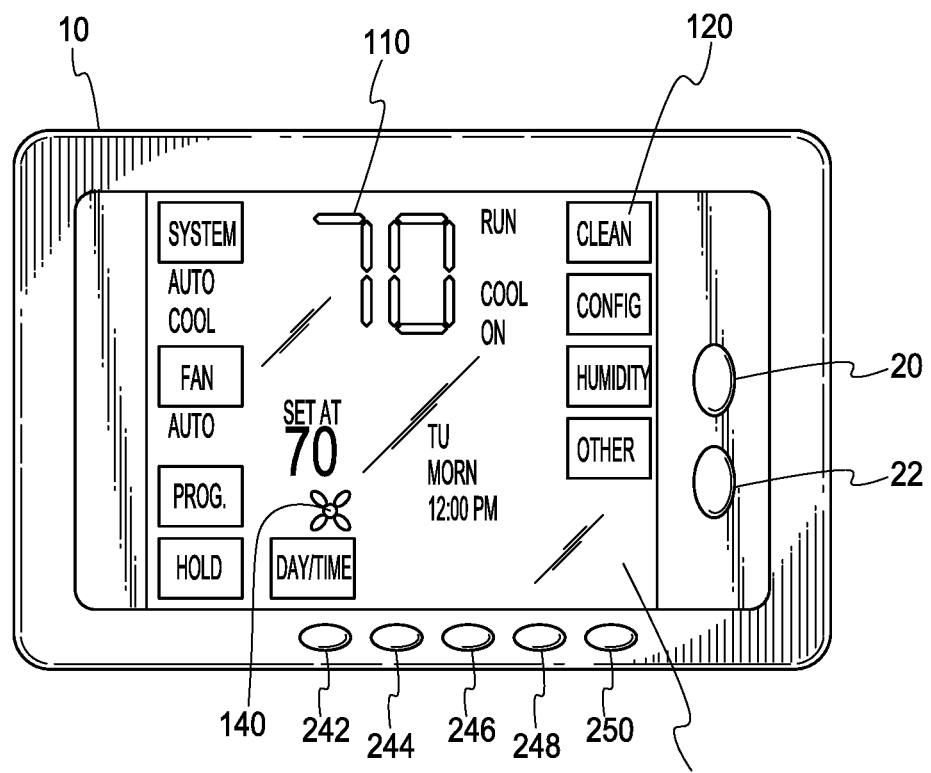
FIGS. 7-15 are views of the display screen of various user interface screens displayed by an environmental control constructed in accordance with this disclosure.

Turning to FIG. 7-18, the operation of the environmental controller 10 will be described in further detail. Turning to FIG. 7, the display of the environmental controller displaying multiple icons is disclosed. In particular, an environmental controller 10 includes a display screen 12. A pair of mechanical buttons 20 and 22, which can be divided into an up button 20 and down button 22, are mounted on the front of the environmental control 10. The environmental control 10 includes a front face 17. The mechanical buttons 20 and 22 are mounted so that the mechanical buttons 20 and 22 are exposed in the front face 17 and may be easily operated by a user. As shown in FIG. 7, the environmental controller 10 is oriented so that one of the mechanical buttons 20 is located at the upper portion of the environmental controller 10 and the second mechanical button 22 is located toward the lower portion of the environmental controller 10. Accordingly, the one mechanical button 20 can act as an "up" button, and accordingly, can serve as the "up" incrementation of adjustment of a set point. In addition, the mechanical button 22 can serve as a "down" button, and accordingly, can act as a decrementation or adjustment of a set point.

The environmental controller 10 includes a display 12, which is generally not a touch sensitive display. Rather, it includes additional mechanical buttons. In particular, mounted on a lower portion of the front face is a FAN button 242, a TIME button 244, a PROG/BACK button 246, a HOLD/NEXT button 248, and a RETURN button 250.

The FAN button 242 controls the operation of a fan. When depressed, the FAN button 242 toggles through different fan modes; i.e., AUTO, ON, and OFF. For example, when the fan mode is set to AUTO, pressing the FAN button 242 will change the fan mode to ON. Pressing the FAN button 242 WILL change the fan mode to OFF. Pressing the FAN button 242 a third time will bring the fan mode back to AUTO. The active fan mode will typically be displayed on the display 12, either in textual or icon form.

The TIME button 244 will allow the user to set the time along with the UP button 20 and the DOWN button 22. In particular, pressing the TIME button 244 can highlight the hour of the displayed time on the display 12, which the user can then adjust with the UP button 20 to increment the hours or the DOWN button 22 to decrement the hours. When the hours are correct, the user can then press the HOLD/NEXT button 248, which will highlight the minutes of the displayed time on the display 12. The user can then adjust the minutes with the UP button 20 to increment the minutes or the DOWN button 22 to decrement the minutes. When the minutes are correct, the user can then press the HOLD/NEXT button 248, which will highlight an AM/PM indicator. The user can then adjust between AM and PM using the UP button 20 or the DOWN button 22. When AM or PM is correctly displayed, the user can then press the HOLD/NEXT button 248 to set the time. If the hour of the time is programmed incorrectly and the user notes the same before actually setting the time, the user can press the PROG/BACK button 246, which will take the user back one field;

i.e., from minutes to hours, and the user can then reprogram the hour field as previously discussed.

The PROG/BACK button 246 will bring up a programming menu, such as that discussed below in FIGS. 8-12, and also serves as the "BACK" function; i.e., it will allow a user to move between one graphical field or screen to a previous graphical field or screen.

The HOLD/NEXT button 248 also serves multiple functions. In particular, the HOLD/NEXT button 248 can, in normal operation, set a presently selected environmental parameter to a constant, as opposed to temporary, parameter. For example, if temperature is selected, pressing the HOLD/NEXT button 248 will set the presently set temperature to a constant parameter as opposed to a temporary parameter; i.e., one that deviates from a programmed schedule for a set period, such as one hour as is known in the art.

The RETURN button 250 can perform two separate functions. The first function is to transition from SYSTEM mode to the operator mode pictured in FIG. 7; in particular, a normal press on the RETURN button 250 can cause the environmental controller 10 to transition from SYSTEM mode to the operator mode. However, the RETURN button 250 can also cause the environmental controller to transition from operator mode to SYSTEM mode; for example, a long press can cause the environmental controller 10 to transition from operator mode to SYSTEM mode.

The display includes numeric icons 110, alpha-numeric icons 120 and graphical icon 140. In the embodiment displayed in FIG. 7, the numeric icon "70" 110 is an indication of the current room temperature and is indicated as such by the "ROOM" icon. As well, an alpha-numeric icon is indicating that the HVAC cooling system is running as indicated by the "COOL ON" icon. Other numeric icons are displayed including "70" which is displayed below the alpha-numeric icon "SET AT"; so "70" is the set point at which the environmental controller is set to trigger the HVAC system. Numeric icon "12:00" indicates a set point at which the temperature should be at 70 degrees. According to the alpha-numeric icon "TU MORN" indicating that on Tuesday mornings at 12:00 p.m., the set point should be 70 degrees Fahrenheit.

The graphical icon 140 in this embodiment is a representative pictorial of a fan blade and indicates that the fan mode is on and running. Other types of graphical icons may be provided on the display 12, with the intention of conveying information in a readily understandable manner to the user.

Other alpha-numeric icons 120 are included on the display 12. For example, as depicted on the display 12 in the embodiment of FIG. 7, additional alpha-numeric icons 120 include "CLEAN" "CONFIG" "HUMIDITY" "OUTDOOR" "SYSTEM" "FAN" "PROG" (PROGRAM) "HOLD" "DAY/TIME". Generally, the adjustment of the set points and other quantities displayed on the display will be through the mechanical switches 20 and 22.

The initial setting of the environmental controller 10 involves configuration of installer settings in the embodiment disclosed in FIG. 7. The installer settings can be accessed by, for example, a user pressing the RETURN/SYSTEM button 250 and holding it for three seconds.

Figure 8:
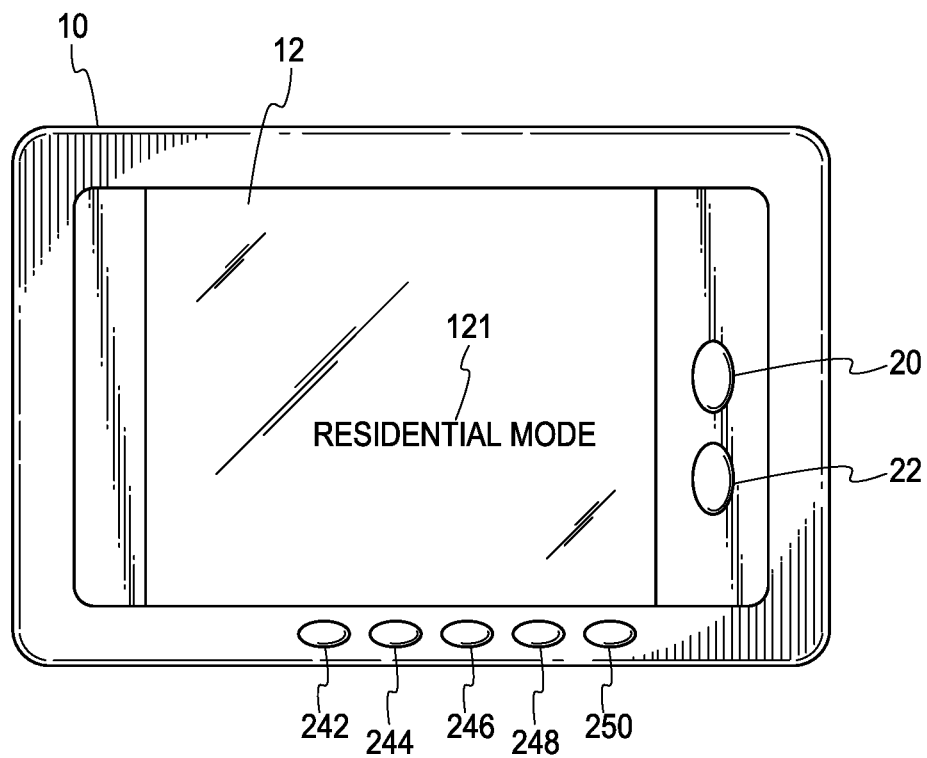

Once the installer setting mode has been selected by holding down the SYSTEM button 250, the display screen 12 will advance to the installer setting mode, as depicted in FIG. 8. The display on the display screen 12 is adjusted so that an alpha-numeric icon 121 bearing the text "Residential Mode" is displayed. The display of the alpha-numeric icon 121 indicates that the user can set a residential mode. The alternate mode to be selected would be a commercial mode.

The mechanical buttons 20 and 22 are used in order to select the residential or commercial mode by scrolling through the available options. In an embodiment the environmental control 10 may provide for factory default settings. For example, in an embodiment, the residential installer setting mode may be the default factory setting. In a case where the installer desires for the residential mode to be selected as an installer setting when the "Residential Mode" alpha-numeric icon is displayed on the screen, the user can select the "NEXT" button 248 in order to advance to the subsequent mode to be selected. If the user is finished with the display screen, she may then choose the "BACK" button 246 in order to go back to the previous screen or she may select the "RETURN" button 250 in order to return to the previous selected mode display. In the case, where the user has selected the "NEXT" button 248, the environmental controller 10 will display on the display screen 12 the display of FIG. 9.

Figure 9:
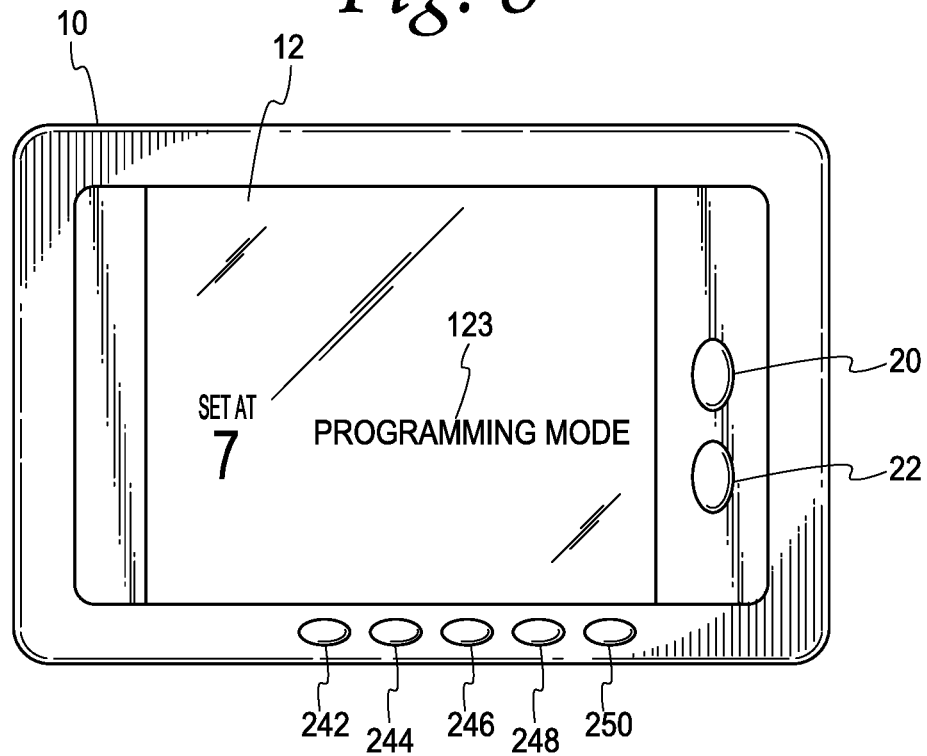

The display of FIG. 9 depicts the programming mode for the installer settings and the alpha-numeric icon "Programming Mode" 123 is displayed to indicate programming mode may be "SET", as indicated by the alpha-numeric icon "SET" 124. Multiple options to be programmed are available and are designated with respect to the alpha-numeric icon "7" 125. The icon "SET AT" 124 indicates that the programming mode may be set at option number "7". In this embodiment, the factory default setting is "7". When the display screen is initially displayed, after advancing from the previous mode (i.e. the residential or commercial selection mode) the "7" 125, icon is automatically displayed on the display screen 12. The user may select other available options by depressing the first mechanical button 20 or the second mechanical button 22, which will adjust the icon 125 to the selected option. For example, by pressing mechanical button 20, the selected option may be incremented to the next available option, such as "8," and if the mechanical button 22 is pressed, the selected option may be decremented to the previous option, such as "7."

Based on the sequence of events as discussed with respect to FIGS. 7-9, it may be understood that during the first mode of operation with respect to determining a residential or commercial mode as identified by alpha-numeric icon 121, the mechanical buttons 20 and 22 are utilized to make a selection with respect to a first residential or commercial mode. Thereafter following depression of the "NEXT" button 248, a second mode of operation ("i.e., the programming mode) as designated by alpha-numeric icon 123 is displayed and adjusted via the actuation of the mechanical buttons 20 and 22 in order to adjust the programming option with respect to alpha-numeric icon 125 displayed on the display screen 12.

Figure 10:
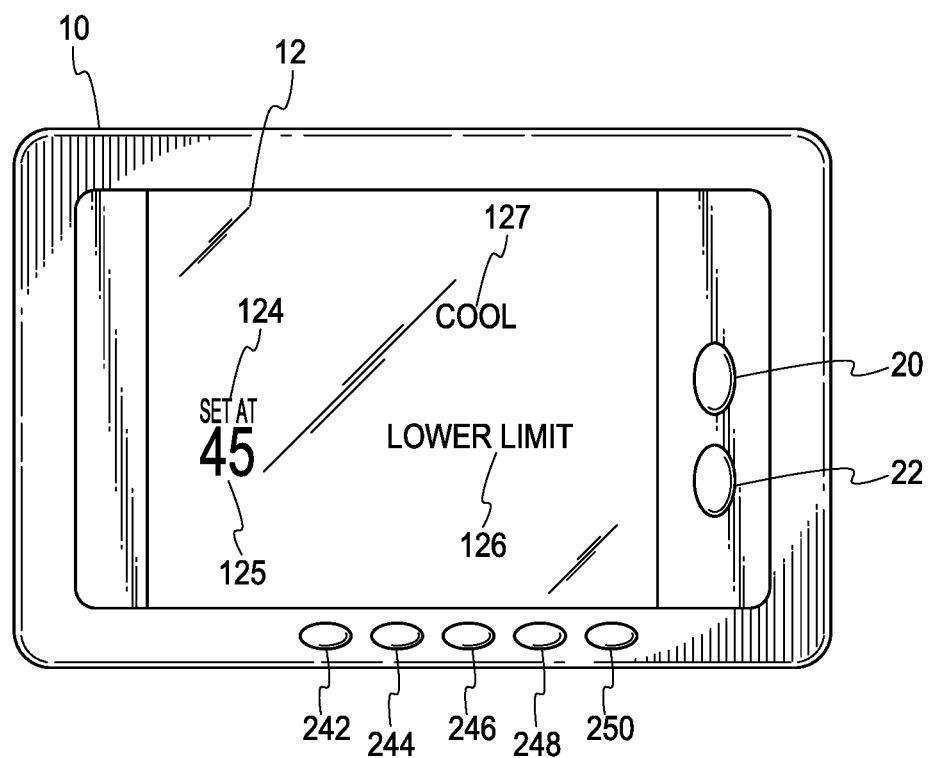

With respect to FIG. 9, once the user has completed the selections with respect to the programming mode, the activation of the "NEXT" button 248 will provide a new display as shown in FIG. 10 that allows for a cooling set point lower limit to be set. This additional installer setting screen depicted on FIG. 10 is alpha-numeric icon 126 indicating the limit ("Lower Limit") for the set point. The icons 124, 126 indicates the lower limit of the cooling functionality of the environmental control 10. Alpha-numeric icon "SET AT" 124 indicates that the limit may be set at the value displayed with respect to numeric icon 125 (i.e., "45"). The display indicates that this is a cooling limit with respect to alpha-numeric icon 127 "COOL". The numeric icon 125 allows for the setting of a temperature. In an embodiment, the temperature range provided may be 45 degrees F. to 90 degrees F. This will be the installer set lower limit for cooling for operation of the environmental control 10.

The set point value for the lower limit is adjusted using the mechanical buttons 20 and 22. By depressing the "UP" mechanical button 20 the numeric icon 125 is incremented upwards towards an upper limit such as 90 degrees. The user may depress the mechanical button 20 serially, degree by degree, in order to move to the desired temperature setting or may depress the mechanical button 20 and hold it down in order so that the numeric icon 125 will automatically scroll and increment upward through the temperature range, for example from 45 degree F. to 90 degrees F. In an embodiment, the factory default will be 45 degrees F. and when the initial display appears as shown in FIG. 10, the numeric icon 125 will be "45". Therefore, any change made initially by a user will be to increment by depressing the "UP" mechanical button 20. However, should the user go past the temperature setting desired, she may then decrement the numeric icon 125 by pressing the "DOWN" mechanical button 22 in order to lower the desired temperature settings. Therefore, it is understood that the cooling lower limit mode was selected by actuation of the "NEXT" mechanical button 244 in FIG. 9 and, upon display of the lower limit icon 126 as depicted in FIG. 10, the set point was adjusted by actuation of the mechanical buttons 20 and 22.

Figure 11:
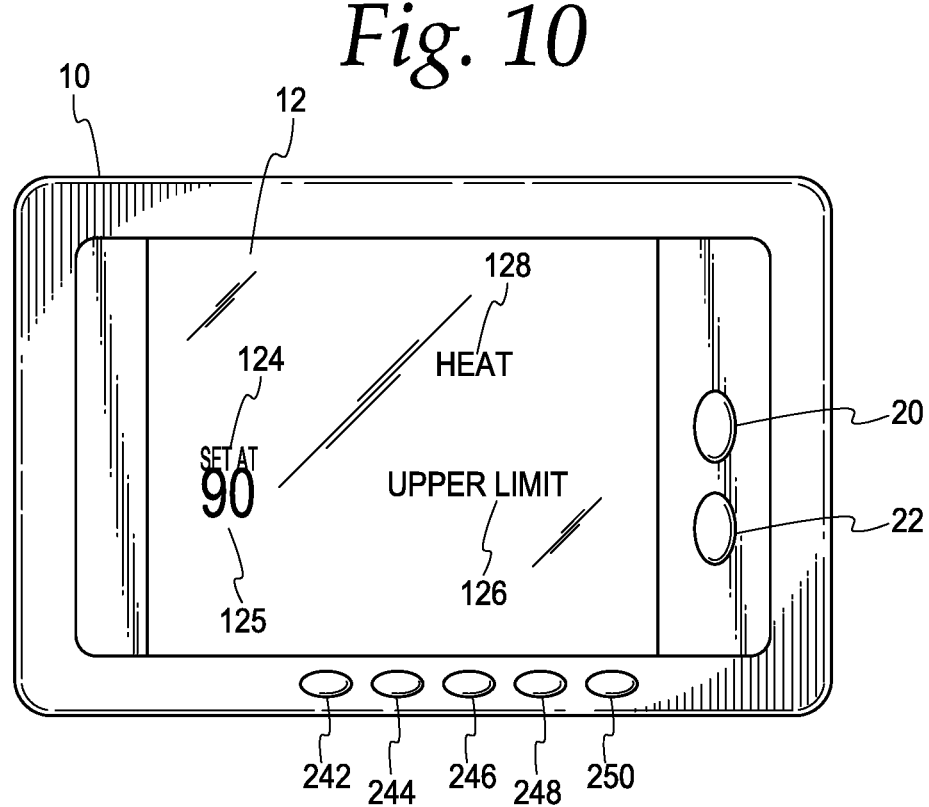

Once the set point lower limit for cooling is set, the user may advance to the next mode selection by activating the "NEXT" button 248 which will reset the display screen 12 (as shown in FIG. 11) for setting the upper limit for the heating mode. The display screen 12 identifies that it is the installer setting for the upper limit for the heating mode. The display screen 12 displays alpha-numeric icon 128 "HEAT" and the alpha-numeric icon 126 "Upper Limit" for the limit. As discussed with respect to the cooling lower limit mode (described with respect to FIG. 10), the display of FIG. 11 also includes the "SET AT" icon 124 and the numeric icon 125. In an embodiment, the factory default setting for the heat set point upper limit is 90 degree F. The display is initially displayed with the "90" numeric icon and may be adjusted via mechanical buttons 20 and 22 as described above. Although not depicted, further additional modes of the environmental controller may be provided such as a compressor balance point and auxiliary heat balance point, according to the same sequence of operations as discussed for the previous modes.

Figure 12:
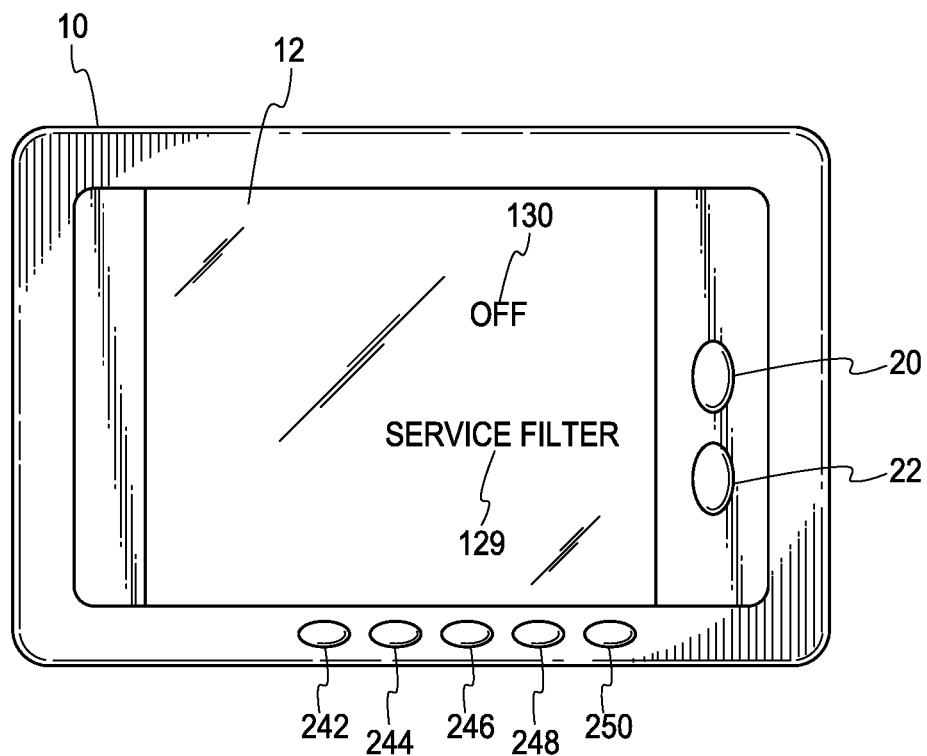

A service filter monitor mode is depicted in FIG. 12 and is identified with respect to icon 129 "SERVICE FILTER". The alpha-numeric icon 130 indicates the option available for the service filter monitor. The default setting in this embodiment is "OFF" indicating that no monitoring of the service filter will be undertaken. Other options may be available such as 30, 60, 90, 120, 180 or 365 days in order to monitor the service filter. These options may be selected via the mechanical buttons 20 and 22. As discussed previously, by depressing the "UP" mechanical button 20, the alpha-numeric icon 130 will be incremented to scroll through the range of options described above. Selection of lower numbers of days or to return the "OFF" selection the user may depress the "DOWN" mechanical button 22, to cause the alpha-numeric icon 130 to decrement through the range of available options. Once the setting is completed, the user may activate the "NEXT" button 248 or return to the previous screen by activating "BACK" button 246.

Figure 13:
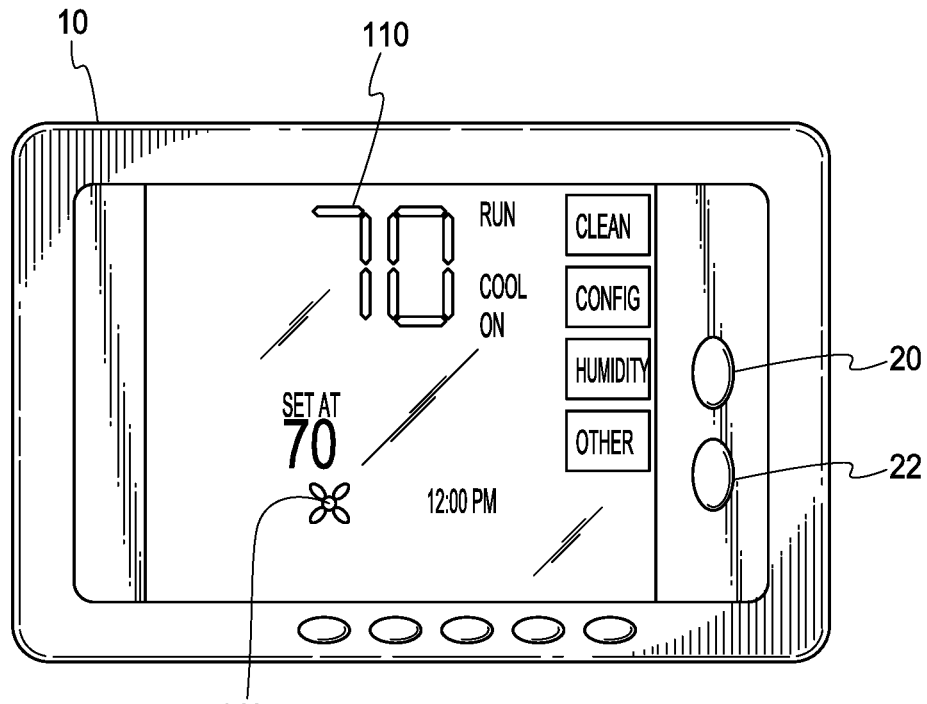
Figure 14:
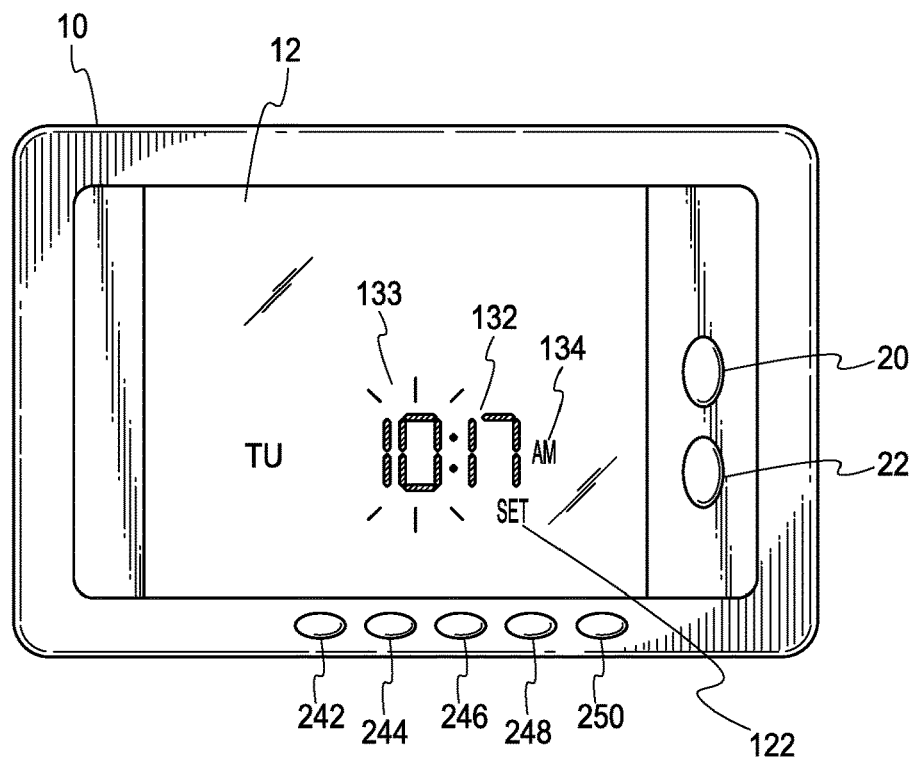

Setting various user settings will now be discussed with respect to FIGS. 13-15. In order to set the time and day, the user selects the "DAY/TIME" button 244. Activation of the "DAY/TIME" button 244 will advance the display to the day/time setting mode as depicted in FIG. 14. The numeric icon 132 appears which represents the time to be adjusted ("10:17"). The icon also includes alpha-numeric icon 133 representing the day of the week (e.g., "TU" for Tuesday), alpha-numeric icon 134 representing either "AM" or "PM" and the "SET" icon 122. The first-time setting mode is to set the hour of the day, which is indicated in FIG. 14 on the display screen 12 by the numeric "10" flashing and the "AM" alpha-numeric icon 134 flashing. In an alternate embodiment, an icon may be modified to indicate that it is being adjusted (e.g. decrement, increment) by a halo icon surrounding the particular icon that is to be adjusted by the user, or other modifications of the alpha-numeric icon, such as using bold, different font type, or placing other graphics around or adjacent the numeric icon.

The display screen 12 having the flashing "10" "AM" indicates to the user that she may adjust the hour icon 133 by using the mechanical buttons 20 and 22. As discussed before, the mechanical buttons 20 and 22 may increment or decrement the value in order to change the hour. It is understood that as the hour is incremented or decremented the alpha-numeric icon 134 will change to "PM" when the end of the 12 hour cycle has been reached. Once the desired set point is reached for the hour mode, the user can press the "DAY/TIME" button 244 in order to advance to the next mode, which is the minute setting mode, as shown in FIG. 15. Should the user want to discontinue the process, she may activate the "RETURN" mechanical button 250 to go back to the previous mode display.

Figure 15:
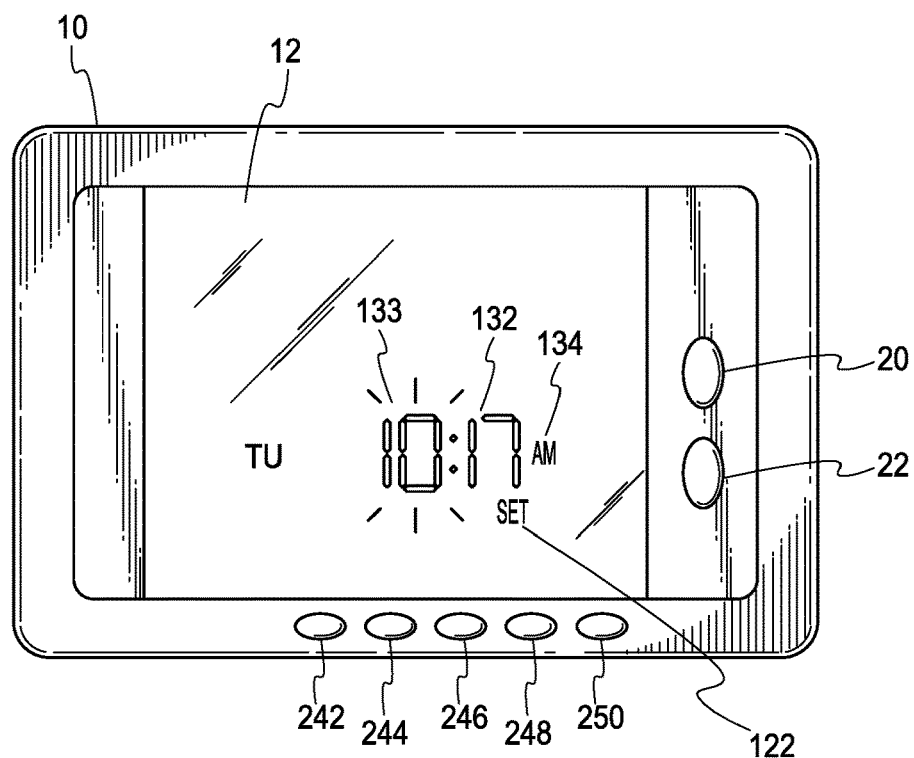

Turning to FIG. 15, the minute setting mode is adjustable, which is evident by the flashing of the minutes (i.e. "17"). The set point for the minutes numeric icon 132 may be adjusted by using the mechanical buttons 20 and 22, in order to increment or decrement the numeric value. The user can clearly see that the minutes numeric icon 132 is being adjusted due to the flashing of the minutes value and due to the disappearance of the hour flashing (as shown in FIG. 14). Once the desired minute set point has been set by the user's actuation of the mechanical buttons 20 and 22, the "NEXT" mode may be reached by activating the "DAY/TIME" button 244.

Obviously, many additional modifications and variations of the present disclosure are possible in light of the above teachings. Thus, it is to be understood that, within the scope of the appended claims, the disclosure may be practiced otherwise than is specifically described above. As an example, other modes can be utilized, such as a humidity control mode. In addition, other interfaces are possible, as long as they incorporate a pair of mechanical buttons along with mechanical buttons for implementing "NEXT," "BACK," and "RETURN" functions.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. An environmental controller comprising:
    i) a housing including an upper component having a display cutout;
    ii) a display disposed within the display cutout, wherein the display is not a touch sensitive display;
    iii) a circuit board disposed within the housing, the circuit board being coupled to the display;
    iv) a microprocessor mounted on the circuit board and being coupled to the display;
    v) a NEXT mechanical switch operatively coupled to the upper component of the housing;
    vi) a BACK mechanical switch operatively coupled to the upper component of the housing;
    vii) a RETURN mechanical switch operative coupled to the upper component of the housing;
    viii) a first receptor mounted on the circuit board and coupled to the microprocessor, the first receptor being coupled to the NEXT mechanical switch so that when the NEXT mechanical switch is operated the first receptor is adapted to communicate a first signal to the microprocessor;
    ix) a second receptor mounted on the circuit board and coupled to the microprocessor, the second receptor being coupled to the BACK mechanical switch so that when the BACK mechanical switch is operated the second receptor is adapted to communicate a second signal to the microprocessor;
    x) a third receptor mounted on the circuit board and coupled to the microprocessor, the third receptor being coupled to the RETURN mechanical switch so that when the RETURN mechanical switch is operated the third receptor is adapted to communicate a third signal to the microprocessor;
    xi) wherein the microprocessor is configured to operate the display in one of an operative mode screen, a first system mode screen and a second system mode screen;
    xii) wherein the microprocessor is adapted to maintain a last screen;
    xiii) wherein the microprocessor is adapted to operate the display in the operative mode screen;
    xiv) wherein on receipt of the third signal, the microprocessor is adapted to shift the display from the operative mode screen to the first system mode screen, and wherein the microprocessor is adapted to set the last screen to the operative mode screen;
    xv) wherein on receipt of the first signal, the microprocessor is adapted to:
        1) shift the display from the first system mode screen to the second system mode screen and set the last screen to the first system mode screen; or
        2) select a next environmental parameter;
    xvi) wherein on receipt of the second signal the microprocessor is adapted to:
        1) shift the display to the last screen; or
        2) select a previous environmental parameter; and
    xvii) wherein, when the RETURN mechanical switch is operated for the third receptor to communicate a fourth signal to the microprocessor, on receipt of the fourth signal the microprocessor is adapted to shift the display to the operative mode screen.

2. The environmental controller of claim 1, wherein, when the NEXT mechanical switch is operated for the first receptor to communicate a fifth signal to the microprocessor, on receipt of the fifth signal the microprocessor is adapted to cause a current environmental parameter set to a constant value.

3. The environmental controller of claim 2, wherein when the display is operated in the operative mode, the microprocessor is adapted to cause the display to display a fan alphanumeric icon, a program alphanumeric icon, a hold alphanumeric icon, and day & time alphanumeric icon.

4. The environmental controller of claim 3, further including:
    a fourth mechanical switch coupled to the upper component of the housing and a fourth receptor mounted on the circuit board and coupled to the microprocessor,
    a fifth mechanical switch coupled to the upper component of the housing and a fifth receptor mounted on the circuit board and coupled to the microprocessor;
    the fourth receptor being coupled to the fourth mechanical switch so that when the fourth mechanical switch s operated the fourth receptor is adapted to communicate a fifth sixth signal to the microprocessor;
    the fifth receptor being coupled to the fifth mechanical switch so that when the fifth mechanical switch is operated the fifth receptor is adapted to communicate a seventh signal to the microprocessor;
    wherein on receipt of the sixth signal the microprocessor is adapted to increment a setting and wherein on receipt of the seventh signal the microprocessor is adapted to decrement a setting.

5. The environmental controller of claim 4, wherein on receipt of the sixth signal the microprocessor is adapted to increment a fan setting and on receipt of the seventh signal the microprocessor is adapted to decrement a fan setting.

6. The environmental controller of claim 4, wherein on receipt of the sixth signal the microprocessor is adapted to increment a time of day setting and on receipt of the seventh signal the microprocessor adapted to decrement a time of day setting.

7. The environmental controller of claim 4, wherein on receipt of the sixth signal the microprocessor is adapted to increment a day of week setting and on receipt of the seventh signal the microprocessor is adapted to decrement a day of week setting.

8. The environmental controller of claim 4, wherein on receipt of the sixth signal the microprocessor is adapted to increment a humidity setting and on receipt of the seventh signal the microprocessor is adapted to decrement a humidity setting.

9. The environmental controller of claim 2, wherein, when the BACK mechanical switch is operated for the second receptor to communicate a sixth signal to the microprocessor, on receipt of the sixth signal the microprocessor is adapted to shift the display to a programming mode screen.

10. The environmental controller of claim 1, wherein, when the display is operated in the operative mode, the microprocessor is adapted to cause the display to display a fan alphanumeric icon, a program alphanumeric icon, a hold alphanumeric icon, and day & time alphanumeric icon.

11. The environmental controller of claim 10, further including:

a fourth mechanical switch coupled to the upper component of the housing and a fourth receptor mounted on the circuit board and coupled to the microprocessor, a fifth mechanical switch coupled to the upper component of the housing and a fifth receptor mounted on the circuit board and coupled to the microprocessor;

the fourth receptor being coupled to the fourth mechanical switch so that when the fourth mechanical switch is operated the fourth receptor is adapted to communicate a fifth signal to the microprocessor;

the fifth receptor being coupled to the fifth mechanical switch so that when the fifth mechanical switch is operated the fifth receptor is adapted to communicate a sixth signal to the microprocessor;

wherein on receipt of the fifth signal the microprocessor is adapted to increment a setting and wherein on receipt of the sixth signal the microprocessor is adapted to decrement a setting.

12. The environmental f claim 11, wherein on receipt of the fifth signal the microprocessor is adapted to increment a time of day setting and on receipt of the sixth signal the microprocessor adapted to decrement a time of day setting.

13. The environmental controller of claim 11, wherein on receipt of the fifth signal the microprocessor is adapted to increment a day of week setting and on receipt of the sixth signal the microprocessor is adapted to decrement a day of week setting.

14. The environmental controller of claim 11, wherein on receipt of the fifth signal the microprocessor is adapted to increment a humidity setting and on receipt of the sixth signal the microprocessor is adapted to decrement a humidity setting.

15. The environmental controller of claim 11, wherein on receipt of the fifth signal the microprocessor is adapted to increment a fan setting and on receipt of the sixth signal the microprocessor is adapted to decrement a fan setting.

\* \* \* \* \*